AIR FLOW CONTROL AND CELL DEFLECTOR BLADE SYSTEM
WITH DIRECT ACCESS MATRIX FILE

Filed Jan. 4, 1965

2 Sheets-Sheet 1

INVENTORS
WALTER L. GRABOWSKI
BJARNE JUNGE
ELWOOD H. STORM

By John L. Jackson

ATTORNEY

United States Patent Office 3,334,785

Patented Aug. 8, 1967

3,334,785

AIR FLOW CONTROL AND CELL DEFLECTOR BLADE SYSTEM WITH DIRECT ACCESS MATRIX FILE

Walter L. Grabowski, San Jose, Bjarne Junge, Los Gatos, and Elwood H. Storm, Santa Cruz, Calif., assignors to International Business Machines Corporation, Armonk, N.Y., a corporation of New York Filed Jan. 4, 1965, Ser. No. 423,015
1 Claim. (Cl. 221—88)

This disclosure relates to random access memory files in general and more particularly to a file wherein information is stored in a cell, a number of which are stored in a drawer-type matrix file which is accessed pneumatically to effect selection and transport of a desired cell to an input/output station.

Problems attendant the storage of information on reels whether the information is photographic or magnetic are well known. Thus, while the available capacity of reel storage is relatively great, the average access times involved in addressing a selected or desired record is relatively high. One of the systems which has evolved from attempts to overcome this access time problem employs storage of information on short lengths of photographic or magnetic tapes. As is obvious, in this type of arrangement the accessing mechanism can go directly to the strip on which the desired information is recorded and thereby lower required access times.

Several systems are presently known wherein this type of strip storage in cells, which in turn are stored in bins or drawers, is utilized. One of the earliest systems wherein this type of storage concept is utilized is presented in U.S. Patent 3,149,529 to Critchlow, entitled, "Direct Access Photo Memory." Other types of systems similar to the storage of information on discrete lengths of film or tape employ conventional aperture cards for the basic storage media. The aperture cards may be sorted or scanned in conventional punch card equipment. As is obvious, the storage capability of this latter type of system is quite limited since a great amount of potential storage space is taken up by the card itself which is quite inefficient as far as storage capabilities are concerned. The former type of system, while being a great step forward in the art, does, however, possess certain disadvantages. In considering the system's efficiencies, it will be seen that the individual strips are removed from the cells and transported to a read/write station for reading and then are returned via the transport mechanism to the individual cell from which it was withdrawn. Obviously, this type of system is relatively slow. Not only is the mechanism itself relatively slow, but considering the case wherein desired information is contained on several film strips, the accessing mechanism can only handle one at a time thereby preventing overlap of operation.

An object of the present invention is to provide a novel direct access storage matrix file.

Another object of the present invention is to provide a new switching arrangement for use in a direct access matrix file wherein the switching operates both to pneumatically select a desired cell and move it into the output transport path as well as to mechanically set up the path for the cell to travel through.

Another object of the present invention is to provide a new file configuration and system of operation wherein a cell to be accessed is along with a number of other cells first positioned in alignment with a plurality of access channels by drawer movement and then selected from these other cells by selective operation of pneumatic valves.

Other and further objects and advantages of the invention will be apparent from the following more particular description of the preferred embodiment of the invention as illustrated in the accompanying drawings in which.

Briefly, there is provided a three dimensional file wherein one of a plurality of cell drawers is moved in an X direction to align a column of cells containing a desired cell with a number of access channels extending in a Y direction through the other drawers. A pair of deflectors, one at the top of the file and one at the bottom, are operated to direct vacuum and pressurized air, respectively, into the access channel containing the desired cell. Air flows along the Z direction of the file through a bottom channel formed by unselected Z deflectors to a selected Z deflector; thence, in an X direction through a channel of unselected deflectors to a selected X position, up through the access channel of the trays to the cell to be ejected. After reaching the top of the file, the cell is directed in an X direction by the second Y deflector selected with the first Y deflector; thence, along a top channel formed by unselected Y deflectors to a selected Z deflector that is paired with the first Z deflector; thence, out of the file in a Z direction through a channel formed by unselected Z deflectors at the top of the file.

Figure 1:
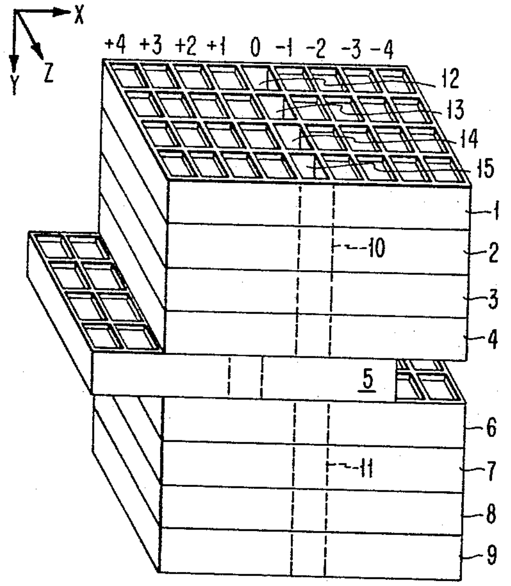
FIG. 1 is a view illustrative of the arrangement of cells in stacked drawers illustrating the provision of access channels for guiding selected cells and the movement of the drawers to cause a group of cells containing the desired cell to be positioned in alignment with the access channels.

The basic file configuration will be better understood by reference to FIG. 1. In FIG. 1 is shown a file made up of nine planes or drawers labeled 1–9, respectively. Each of the drawers contain eight storage columns labeled positionwise +4— —4. In each of these storage positions are contained the data bearing members which may be cells containing film or tape strips. The cells are the basic file storage containers. Each of the drawers also contain a void colume labeled O. There are four access pockets 12–15 in each drawer void column. No member is stored in the access pockets; instead, the void pockets, when in alignment, constitute access or transport channels through which selected cells from a selected drawer may be passed.

In operation, when all of the drawers are moved to the home position, the access pockets of each of the drawers are in alignment and provide a continuous passage through the file. A cell may be then transported through this continuous passage by means of a pneumatic motive force, by a pusher rod or other similar mechanical movement. In herein described file, the motive force for transporting cells will be pneumatic. The pneumatic supply, as will hereinafter become more apparent, if the file contains a large number of trays, is applied both to the top of the file and to the bottom of the file while, if a lesser number of trays are utilized, either suction applied to the top drawer of the file or pressure applied to the bottom drawer, will suffice.

In this file configuration, when a cell is to be withdrawn from the file, vacuum is applied to the top drawer of the file and pressurized air is supplied to the bottom drawer of the file to expel a cell. Upon return of the cell, again as will hereinafter become more clear, the air supply is reversed and the cell is returned down through its access channel to its appropriate drawer location.

While in the description only a file wherein the drawers are moved back and forth in one direction is given, an obvious modification would be the utilization of a bi-directional drawer arrangement.

In FIG. 1 the drawers 1–4 and 6–9 are shown at the home position such that, as illustrated by the dotted lines 10 and 11, an access channel is provided by drawers 1–4 and 6–9, respectively. The drawer 5 has been displaced two columns to the left such that the −2 column is now in alignment with the access channels 10 and 11. Any suitable means may be used to move the drawers, as the drive mechanism could be any of several known in the art. For example, the previously mentioned Critchlow patent shows a rack and pinion drive which could be used. By supplying pressurized air to the bottom of the file and, additionally, by applying vacuum to the top of the file, the cells in the −2 position of drawer 5 can be ejected. As will later become more apparent, only one of the cells will be ejected at a time since the pneumatic supply is attached to only one of the rows of the selected columns of cells.

Figure 2:
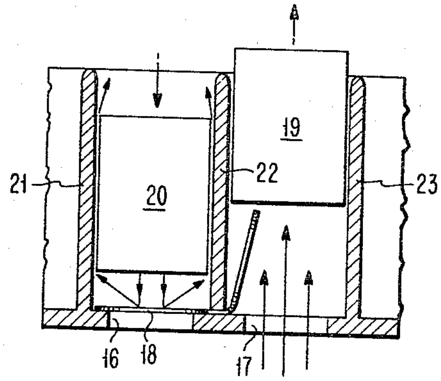
FIG. 2 is a cutaway view of two of the cell pockets of a drawer.
Figure 3:
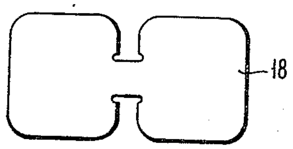
FIG. 3 is a top view of a flapper valve used in the cell pockets to allow pneumatic ejection and transport and upon cell return provide cell deceleration.

In FIG. 2 is shown in more detail two cell pockets of the file. As shown in FIG. 2, the cell pockets are of the type wherein air may be supplied to the lower portion of the cell pocket while vacuum is supplied to the upper portion for cell ejection and upon cell return the penumatic supply is reversed. The particular design shown in FIG. 2 was utilized since, in a store where members contained in a tray are pneumatically ejected and later returned, acceleration and deceleration in a rapid access environment must be taken into account. Thus, the apertures 16 and 17 are covered by a flapper valve 18 at the bottom of each cell pocket. Air directed up through the aperture 17 lifts the flapper and forces the cell 19 from its position in the drawer. The large aperture 17 and compliant flapper 18 permits a large volume of air to rapidly eject the cell. The flapper 18 is resilient such that when the supply of air through the aperture 17 has been terminated, the flapper will again seat to cover the aperture. A top view of the flapper is shown in FIG. 3. The flapper completely covers the apertures 16 and 17 when no air is applied to them. When a cell 20 is returned to its pocket position, the flapper 18 lies over the aperture 16 so that an air cushion is formed between the bottom of the descending cell 20 and the flapper. This is necessary since the cell enters the tray at a high velocity and must be decelerated to prevent damage. Deceleration rate is controlled by selecting an appropriate value of clearance between the cells and the walls 21, 22 and 23 of the cell pockets.

Figure 4:
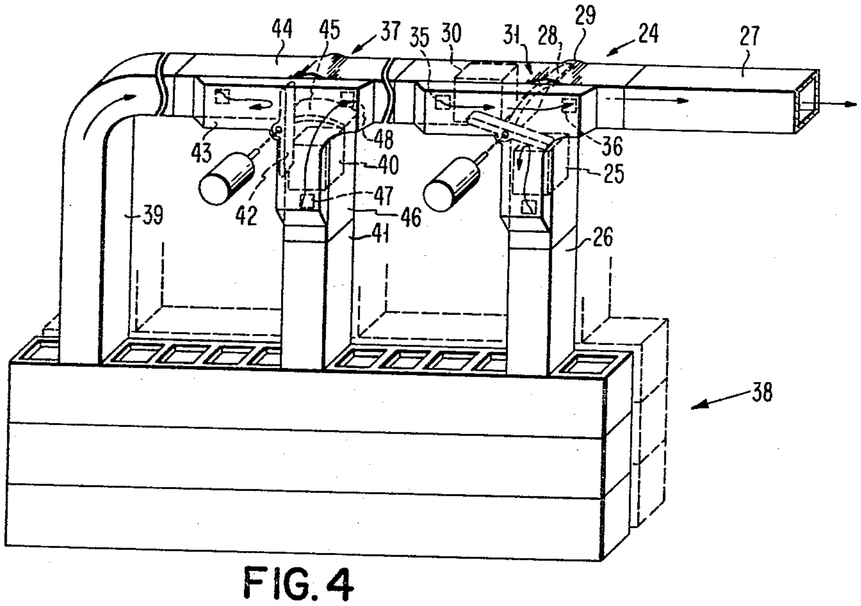
FIG. 4 is a detailed view illustrating a pneumatic and mechanical switch and buffer which can be utilized in the subject invention to accomplish pneumatic and mechanical switching as well as cell buffering.

Refer next to FIG. 4 wherein is shown a type of buffer selector switch which may be utilized when the file concept of FIG. 1 is expanded into a relatively large storage file. Obviously, the file example of FIG. 1 can be given greater capacity by adding additional cell storage pockets. However, if the drawers must move too great a distance to position a desired cell on an access channel, the external dimensions of the file become too large and, additionlly, required access times rise. Therefore, a number of additional access channels will be added. In such a file, it is clear that each access channel must have an input/output channel connected to it such that the cells can be selectively removed. Likewise, there may be one or more transport tubes between the file and an input/output station. Therefore, some means of switching and buffering the accessed cells pending their passage through the transport tube or tubes must be provided. The problem is compounded by the requirement that pneumatic flow must be maintained throughout the system if overlap of operations is to be accomplished.

The buffer-selector valves shown in FIG. 4 have been found to be ideally suited for operation in this type of file environment. While in FIG. 4 there is shown two valves, it will be understood that the number actually used will depend on the number of columns of access channels actually used. There must be one per access channel. Thus, the configuration of FIG. 4 would only suffice, as shown, where there is a single row of cells in a drawer. For additional rows additional valves would have to be added. These valve outputs would then be brought together to form a single input/output channel.

Figure 5:
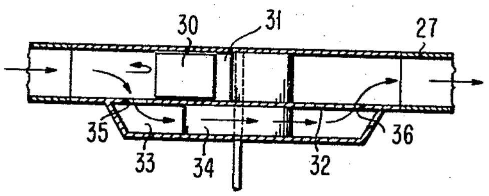
FIG. 5 is a top cutaway view of one of the buffer switches of FIG. 4.

In FIG. 4 the buffer selector switch 24 is shown in a condition operable to pass a cell 25 contained in its file acccess channel tube 26 into the sub-channel 27. Thus, the rotatable double-vaned blade is positioned such that the selector vane 28 is seated in the selector vane seat 29 thereby blocking the cell 30 which is positioned in the main switch channel 31. As shown more clearly in FIG. 5, a wall 32 separates the main switch channel 31 from a pneumatic bypass channel 33. With the selector vane 34 in the position as shown in FIG. 4, the cell 30 is blocked from movement through the main switch channel, but air may continue to flow through the system around the selector vane 34. The air flows into the left arm pneumatic port 35 through the bypass 33, over the flow vane 34 and out of the right arm pneumatic port 36 into the sub-channel or transport tube 27.

In FIG. 4 the buffer selector switch 37 is shown in a position such that the cell 30 has been passed from the file 38 through its file access channel tube 39 into the position shown in FIG. 4. Likewise, in this position the buffer selector valve 37 acts as a buffer to hold the cell 40 which is in the file access channel tube 41. As shown in FIG. 4, the flow vane 42 is positioned such that the left arm pneumatic bypass 43 of the buffer selector switch 37 is blocked such that air from the tube 39 must pass down the main switch channel 44. Likewise, the selector vane 45 is in a position such that the cell 30 could pass over it into the buffer selector switch 24. Wtih respect to cell 40, the selector vane 45 has been rotated such that it blocks the switch sub-channel 46; however, air continues to flow from the tube 41 through the leg pneumatic port 47, past the selector vane 42 and out the right arm pneumatic port 48. The flow of air maintains the cell 40 in the buffer selector switch 37 such that it will not drop back down into the file 38.

A more complete description of this type of buffer-selector valve will be found in a co-pending United States application assigned to the assignee of the subject invention entitled "Pneumatic Carrier Selector Valve, Decelerator and Hold Mechanism," Ser. No. 388,377, now Patent No. 3,272,456.

Figure 6:
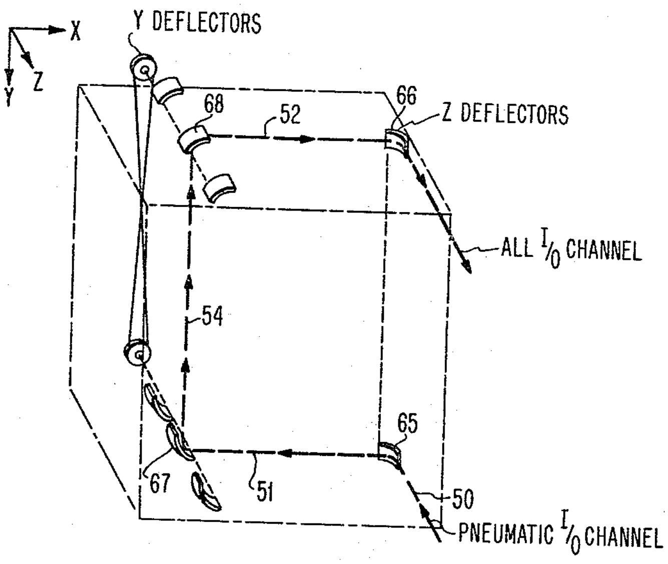
FIG. 6 is a schematic view illustrating the system pneumatic switching and mechanical and pneumatic path of the cells.

In FIG. 6 is shown a system flow model illustrating the direction of cell movement and pneumatic control utilized to select any cell in a multiple drawer array each having a number of columns of access channels. In the following description, columns will run in the Z direction and rows will run in the X direction.

Considering first the cell ejection, air pressure is applied to the file pneumatic input tube as illustrated by the lines 50 and 51 in a direction as indicated by the arrow heads. At the same time suction is applied to the top of the file as illustrated by lines 52 and 53 resulting in air flow through a selected access channel 54, in the direction as indicated by the arrows therein, of sufficient strength to eject a cell positioned in the access channel.

Figure 7:
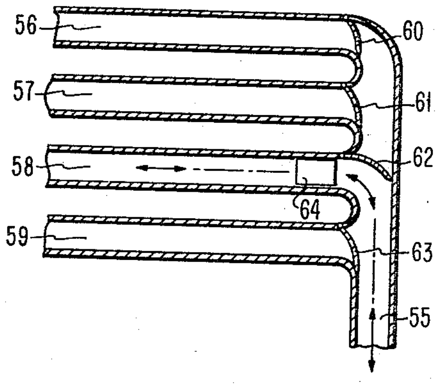
FIG. 7 is a view showing a type of valve useful in the subject system to effect mechanical and pneumatic switching where no buffering is needed.

The incoming pressure is first applied along line 50 and passes down through an array of pneumatic and mechanical path control valves. The array may take, for instance, the form shown in FIG. 7. In FIG. 7 is shown an input/output tube 55 which can be selectively pneumatically and mechanically connected to one of the subchannels 56–59 by selective operation of hinged baffles 60–63, respectively. While only pneumatic switching is required in the lower part of the file, this type of array is capable, as illustrated and hereinafter described, of switching cells. Thus, the baffles 60–63 are curved such that they will guide a cell 64 into and out of the main channel 55. Additionally, the baffles are operable to pneumatically seal off their associated subchannels from the main channel or pneumatically connect their associated subchannel to the main channel, as illustrated, by baffle 62.

In FIG. 6 the air pressure travels along path 50 until it is deflected down the subchannel by means of a Z baffle. This is illustrated by baffle 65 shown at the bottom of the schematic, which is ganged with baffle 66 shown at the top of the schematic. As discussed with respect to FIG. 7, this baffle constitutes only one baffle in an array and it is obvious that any of the other baffles in the array (not shown) could have been interposed into the path of the air stream to divert the flow of air down a channel parallel to any of the rows in the array. This channel is formed by an array of nonselected valves similar to that of FIG. 7. Thus, as is obvious, any one can be operated to cause the air to move in a vertical direction through a selected channel. The selected Y baffle 67 causes the flow of air to move in the vertical direction up through access channel 54 formed by the nonselected drawers. This baffle is ganged with Y baffle 68 on the top of the file which is operative to cause any cell which was sitting on access channel 54 to be deflected by baffle 68 along path 52 which again is made up of an array of baffle selector valves similar to those of FIG. 4. The cell is then deflected by Z baffle 66, which is ganged with baffle 65 out of the file along path 53. In this manner the pneumatic air pressure is caused to select a row of the file by means of operation of a Z deflector and an access channel is selected by means of operation of a Y deflector to cause the cell sitting in the access channel to be ejected and guided by means of ganged deflectors 68 and 66. As is obvious, the deflectors 66 and 68 function not only to provide a pneumatic path, but, additionally, function to provide a mechanical path for guidance of the selected cell. Again, as was previously explained, a desired cell must have previously been positioned over the access channel 54 formed by the access channels of the drawers prior to the ejection operation. Thus, the configuration of the drawers where access channels are provided through them as well as the operation of the deflectors is necessary for cell selection and transport.

Figure 8:
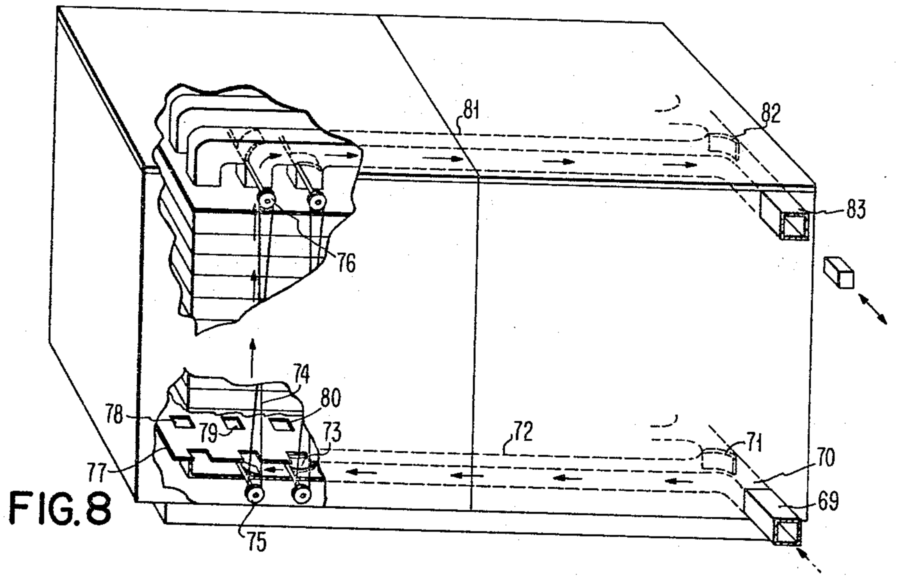
FIG. 8 is a view illustrating overall file layout and system flow.

In FIG. 8 is shown an overall file layout. In FIG. 8, for purposes of illustration, the cells in the drawers will be displaced to physically accommodate the buffer-selector valves. As shown in FIG. 4 the buffer-selector valves are wider than one cell width and this is the reason for the wider spacing in the overall file layout of FIG. 8. However, in an actual file, for purposes of high capacity, the cells would not be so widely separated and to overcome the problem of the wide buffer-selector valves adjacent valves would be vertically displaced such that there would be no interference between the valves. The output tubes associated with each of the valves would then be brought together by means of a deflector valve to provide one input/output. In FIG. 8 is shown a pneumatic input/output tube 69 which, as illustrated by dotted lines, is in pneumatic communication with a pneumatic path 70, which, as shown in FIG. 8, has interposed in its path a deflector 71 to cause the pneumatic flow of air to pass through the channel 72, which is diverted in a vertical direction by means of flapper valve 73, which is operated by means not shown through a cable 74 and pulley 75 and pulley 76 to cause the upper baffle to be ganged with it. As shown in FIG. 8, the flapper 73 can be interposed in the path of the subchannel 72 in a manner similar to that of the valves of FIG. 7. Also shown in FIG. 8 is a plate 77 having therein orifices 78, 79 and 80 which correspond to columns of access channels. Thus, selective operation of the lower valves will cause pressurized air to pass through either of the apertures. As previously discussed, the selection of the rows takes place at the input pneumatic channel 70. The pneumatic flow and selected cell which was interposed by means of shifting of the drawers in the file passes along subchannel 81 and again is deflected by means of a deflector 82 interposed in its path into the output or main tube channel 83.

In summary, there has been provided a three dimensional file wherein one of a plurality of cell drawers is moved in an X direction to align a column of cells containing a desired cell with a number of access channels extending in a Y direction through the other drawers. A pair of deflectors, one at the top of the file and one at the bottom, are operated to direct vacuum and pressurized air, respectively, into the access channel containing the desired cell. Air flows along the Z direction of the file through a bottom channel formed by unselected Z deflectors to a selected Z deflector; thence, in an X direction through a channel of unselected deflectors to a selected X position, up through the access channel of the trays to the cell to be ejected. After reaching the top of the file, the cell is directed in an X direction by the second Y deflector selected with the first Y deflector; thence, along a top channel formed by unselected Y deflectors to a selected Z deflector that is paired with the first Z deflector; thence, out of the file in a Z direction through a channel formed by unselected Z deflectors at the top of the file.

Thus, there has been provided a novel direct access matrix file wherein information is stored in cells a number of which are stored in drawers which in turn are stacked to provide a matrix file. Additionally, the cells are transported pneumatically to a remote read/write station by means of a single transport tube. Accessing into the transport channel from the file and from the transport channel back into the file is controlled by means of a novel switching system which operates both to pneumatically select a desired cell from a group of cells in alignment with the access channels and move it into the output transport tube as well as to mechanically set up the path for the cell to travel through to effect such selection.

While the invention has been particularly shown and described with reference to a preferred embodiment thereof it will be understood by those skilled in the art that the foregoing and other changes in the form and details may be made therein without departing from the spirit and scope of the invention.

What is claimed is:

A file for a storage system wherein selected data bearing members are retrieved from and returned to the file, comprising:

a plurality of stacked drawers including a top drawer and a bottom drawer, a plurality of cells in each of said drawers in rows and columns to store data bearing members, a column of access pockets in each of said drawers, said drawers being movable to align the access pockets thereof to form a plurality of access channels, and to selectively position a column of cells of a selected one of said drawers with said access channels formed by the other of said drawers, a file access channel in alignment with each of said access channels, a sub-channel joined and perpendicular to each of said file access channels, a main file channel joined to said sub-channels, perpendicular to both said file access channels and said sub-channels, a pneumatic supply connected to the main file channel, selecting means for applying air from said pneumatic supply to a selected cell of said selected one of said drawers, said selecting means including a plurality of Y deflectors positioned in the junctions of said file access channels and said sub-channels, means to selectively operate said Y deflectors to supply air from said sub-channels to a selected column of access channels, and a plurality of Z deflectors positioned in the junctions of said sub-channels and said main file channel, means to operate said Z deflectors to supply air from said pneumatic supply to a selected row of said drawers, the Y deflectors and Z deflectors being selected such that a single data bearing member may be addressed and removed from or returned to said drawers through said main file channel by the pneumatic and mechanical path formed by said channels and said selected deflectors.

References Cited

UNITED STATES PATENTS

| | | | |
|---|---|---|---|
| 3,158,287 | 11/1964 | Wilmer | 221—88 X |
| 3,174,645 | 3/1965 | Barcia et al. | 221—88 |

OTHER REFERENCES

IBM Technical Disclosure Bulletin, volume 6, Number 6, page 42, November 1963, 1 page.

ROBERT B. REEVES, *Primary Examiner.*

K. N. LEIMER, *Assistant Examiner.*